(12) United States Patent
Ploix

(10) Patent No.: US 6,918,767 B2
(45) Date of Patent: Jul. 19, 2005

(54) LOCK HOLDING DEVICE AND DISPLAY

(75) Inventor: Dominique Ploix, Paris (FR)

(73) Assignee: L'Oreal S.A., Paris (FR)

(*) Notice: Subject to any disclaimer, the term of this patent is extended or adjusted under 35 U.S.C. 154(b) by 130 days.

(21) Appl. No.: 10/093,461

(22) Filed: Mar. 11, 2002

(65) Prior Publication Data

US 2003/0027106 A1 Feb. 6, 2003

(30) Foreign Application Priority Data

Mar. 9, 2001 (FR) .............................. 01 03250

(51) Int. Cl.$^7$ ............................................. G09B 19/10
(52) U.S. Cl. ....................................................... 434/94
(58) Field of Search ............................. 434/94, 97, 98, 434/99, 100, 377

(56) References Cited

U.S. PATENT DOCUMENTS

| | | | | |
|---|---|---|---|---|
| 1,355,026 A | * | 10/1920 | Austin ......................... 401/117 |
| 3,609,886 A | * | 10/1971 | Vien ............................ 434/99 |
| 3,702,508 A | * | 11/1972 | Netter ......................... 434/99 |
| D276,661 S | * | 12/1984 | Cafazzo ....................... D28/20 |
| 4,533,328 A | * | 8/1985 | McDaniel ..................... 434/94 |
| 4,896,779 A | * | 1/1990 | Jureckson .................... 211/184 |
| 5,626,225 A | * | 5/1997 | Joyce, Jr. .................. 206/308.1 |
| 5,779,479 A | * | 7/1998 | Hawiuk ....................... 434/94 |
| 5,915,435 A | | 6/1999 | Wilen et al. |
| 6,382,416 B1 | * | 5/2002 | Gainey ....................... 206/317 |
| 6,481,148 B1 | * | 11/2002 | Lindgren .................... 43/17.5 |

* cited by examiner

*Primary Examiner*—Kurt Fernstrom
(74) *Attorney, Agent, or Firm*—Finnegan, Henderson, Farabow, Garrett & Dunner, LLP

(57) ABSTRACT

A device includes a support, a lock connected to the support, and a protective element configured to protect the lock. The lock includes a plurality of strands. At least a portion of the protective element is transparent. The protective element is mounted to the support so as to permit movement of the support between a first position and a second position. When the protective element is in the first position, the lock is at least substantially contained inside the protective element and, when the protective element is in the second position, at least a portion of the lock is at least partly accessible to touch.

31 Claims, 3 Drawing Sheets

LOCK HOLDING DEVICE AND DISPLAY

The present invention relates to a device for holding a lock of strands. The device may be used to display the shades of color available from a range of hair dyeing products.

Conventionally, locks of hair are used to demonstrate the range of colors obtainable with a hair dyeing product. The locks are typically configured in the form of loops and adhesively bonded onto a support, for example, made of cardboard.

A presentation method of this sort has several drawbacks. First, the lock of hair is not protected from the external environment. It becomes dirty and its color fades on exposure to light, such as ultraviolet light. Further, because it is attached to a support of relatively large size, it is difficult for the client to get an accurate idea of the effect that would be given to her own hair by a certain color from the range. In addition, the lock is often quite short, which generally makes it difficult to visualize a realistic color effect.

A device for presenting hair curling rods and the curls produced by them is described in U.S. Pat. No. 4,533,328. In this device, a lock of hair is curled and secured to a hair shaping implement. A cover may be provided to protect the lock of hair. A major problem of this configuration relates to the fact that, over time, the curls of the lock relax and extend outside of the cover. The exposed portions of the lock can no longer be suitably protected. Further, in several of the disclosed embodiments, the mounting between the support and the protective element is extremely complex and difficult to use.

One of the aspects of the present invention relates to a device for holding a lock that provides suitable protection for the lock, while at the same time making it possible for the consumer to gain an accurate idea of the actual color of the lock. As used herein, "lock" refers to a plurality of strands. The strands may comprise natural or synthetic hair. In addition, the strands may have an appearance simulating that of strands of hair colored with hair dye.

Another aspect relates to a device for holding a lock that makes it possible to obtain as realistic a representation as possible of the color supposed to be reproduced by the lock.

Yet another aspect of the invention relates to a device for holding a lock that is economical to produce, and that can be mounted on a decorative display stand.

Other aspects will become apparent in the following description. It should be understood that the invention, in its broadest sense, could be practiced without having one or more of the aspects described herein.

A device, according to an aspect of the invention, may comprise a support and a lock connected to the support. The lock may comprise a plurality of at least substantially rectilinear strands. The device may further comprise a protective element configured to protect the lock. At least a portion of the protective element may be transparent. Further, the protective element may be mounted to the support so as to permit movement of the support between a first position and a second position. When the protective element is in the first position, the lock may be at least substantially contained inside the protective element. When the protective element is in the second position, at least a portion of the lock may be at least partly accessible to touch.

According to another aspect, the device may comprise a support, a lock connected to the support, and a protective element configured to protect the lock. The lock may comprise a plurality of strands. At least a portion of the protective element may be transparent. Further, the protective element may be slidable on an outside surface of the support so as to permit movement of the support between a first position and a second position. When the protective element is in the first position, the lock may be at least substantially contained inside the protective element. When the protective element is in the second position, at least a portion of the lock may be at least partly accessible to touch.

Optionally, in the first position of the protective element, the lock may be protected against damage from the external environment, including, for example, dirt, dust, and ultraviolet light, and also may have an increased lifetime compared with a lock used with conventional devices. In an exemplary embodiment, storing the strands of the lock within the protective element may hold the lock in a shape corresponding to the interior of the protective element and improve the lock's appearance and durability.

With an exemplary embodiment, when the protective element is in the second position, the consumer may accurately observe the appearance (e.g., color and texture) of the lock, thus making it possible for the consumer to get an accurate idea of the effect that the color in question will have on her own hair.

The lock may be long enough to provide the consumer with as realistic a color effect as possible. In one exemplary embodiment, the length of the lock may be about 70 mm. Longer or shorter lengths may also be used.

According to an exemplary embodiment of the device, the support may define an axis X. The plurality of strands of the lock may extend from the support in a direction substantially parallel to the axis X of the support. When the protective element is in the first position, it may protect the lock without exerting any appreciable constraint on the lock. The protective element may be irremovably mounted on the support, for example, to prevent the protective element from being lost. Optionally, such an arrangement may increase the durability of the device by preserving the lock over extended periods of use.

In an exemplary embodiment, the protective element may have an effective length. As used herein, the "effective length" of the protective element is the length of the protective element, in the first position, which extends beyond the end of the support and beyond (or substantially as far as) the free ends of the strands. In one embodiment, the strands of the lock may have a length less than the effective length. In another embodiment, the strands of the lock may have a length substantially equal to the effective length.

In a further exemplary embodiment, the support may comprise a grasping portion configured to permit a user to grasp the support with one hand while moving the protective element with another hand from one of the first and second positions to the other of the first and second positions. The support may have an axial length greater than the axial length of the protective element.

In another exemplary embodiment, a portion of the protective element may be transparent. In a further exemplary embodiment, the entire protective element may be transparent.

According to an aspect, the protective element may be slidable on an outside surface of the support during movement between the first and second positions. For example, this arrangement may facilitate the relative movement of the support with respect to the protective element. Optionally, it may limit the risks of damage to the lock after multiple forward and backward movements of the protective element between the first and second positions.

In an exemplary embodiment of the invention, a first locking member may be configured to lock the protective element in the first position and a second locking member may be configured to lock the protective element in the second position. The locking members may be in the form of one or more projections (e.g., flanges and/or lugs) formed on the protective element. These projections may be configured to engage one or more suitable respective recesses (e.g., grooves) formed on the support. The locking members may be configured to emit a sound, such as, for example, a clicking sound, when engaging with the recesses.

In another exemplary embodiment, the projection(s) may be formed on the support and the recess(es) may be formed on the protective element.

According to another aspect, the protective element may have a tubular shape. The protective element further may be open at both of its ends. The protective element may be formed of a transparent material, such as, for example PLEXIGLAS. Other materials may also be used.

In a further aspect, the at least a portion of the protective element being transparent may be treated with at least one ultraviolet stabilizer. This treatment may prevent the color of the lock from fading over time.

According to a still further aspect, the length of the protective element may be chosen such that, when the protective element is in the first position, the free ends of the strands of the lock are located within the protective element at some distance from the free end of the tube. The free end of the tube may be open.

In an exemplary embodiment, the support may comprise a substantially cylindrical shape. In this embodiment, a first end portion of the support may be configured to be grasped by a user and a second end portion of the support may be connected to the lock. The device may have the general form of a pen. Further, the device may allow a variety of presentations, such as, for example, the shades of color available from a range of hair dyeing products. Multiple devices may be displayed on a suitable display stand (e.g., any form of supporting structure) at retail sale locations or in hairdressing salons.

In one exemplary embodiment, the grasping portion of the support may be formed with a small cross-section, so that it can be taken easily between the thumb and the index or middle finger. The cross-section may have a variety of shapes, including substantially flat or circular. Cross-sections having other shapes may be used.

In another exemplary embodiment, the second end portion of the support may be hollow so as to receive an end portion of the lock in a gripping manner. Alternatively, the support may comprise two hollow half-cylinders articulated about an axis parallel to the longitudinal axis of the support. In such a configuration, one end of the lock may be introduced into the support with the two half-cylinders in the open position. After introducing the lock, the two half-cylinders may be closed so as to hold the end of the lock by gripping. The lock may be connected to the support with adhesive. Other connection means may also be used.

In a further exemplary embodiment, the support and the protective element may be formed of at least one thermoplastic material. The thermoplastic material may be chosen from polystyrenes, polyethylene terephthalates (PET), polyvinyl chlorides (PVC), styrene acrylonitriles (SAN), and acrylonitrile-butadiene-styrenes (ABS).

A display, according to another aspect of the invention, may comprise a display stand and at least one device for holding a lock associated with the display stand. The display may comprise at least one additional device associated with the display stand. The device(s) may be removably attached to the display stand. The display stand may be configured in the form of a base made, for example, of transparent plastic, and defining a plurality of housings which may be superimposed. Each of the housings may be configured to accommodate a device with a lock of a given color. The housings may be inclined such that the devices are kept inside the housing under the effect of their own weight (i.e., without requiring additional holding means).

In a further aspect, part of the base may be reserved for affixing a design, such as, for example, a decoration, a trademark, a logo, or any other commercial information associated with the dyeing product.

A system, according to a further aspect of the invention, may comprise a plurality of devices for holding a lock, where each of the devices comprises strands having an appearance different from that of the strands of the other devices.

The accompanying drawings are included to provide a further understanding of certain aspects of the invention and are incorporated in and constitute part of the specification.

Figure 1:
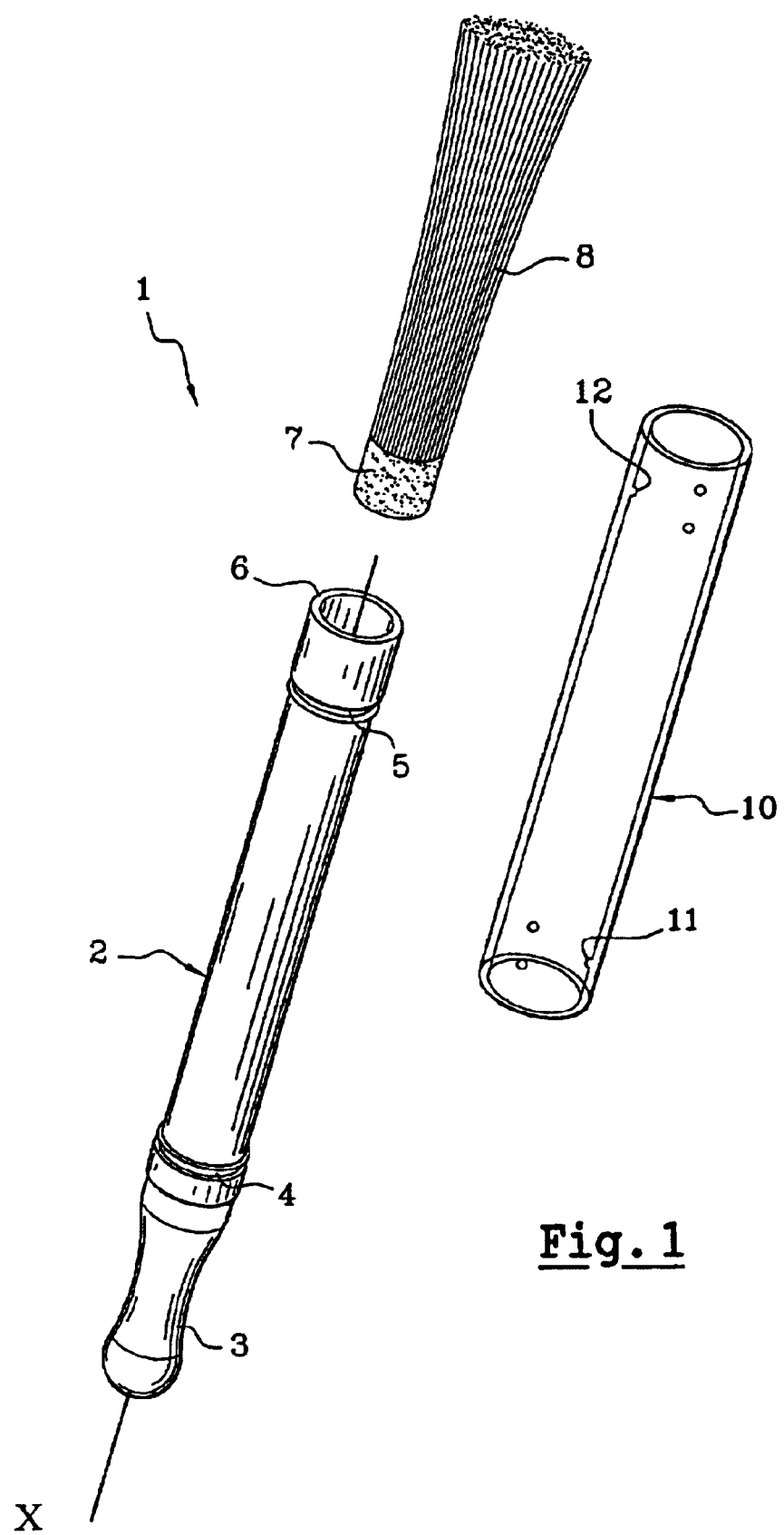
FIG. 1 is an exploded view of a device according to an exemplary embodiment of the present invention.
Figure 2A:
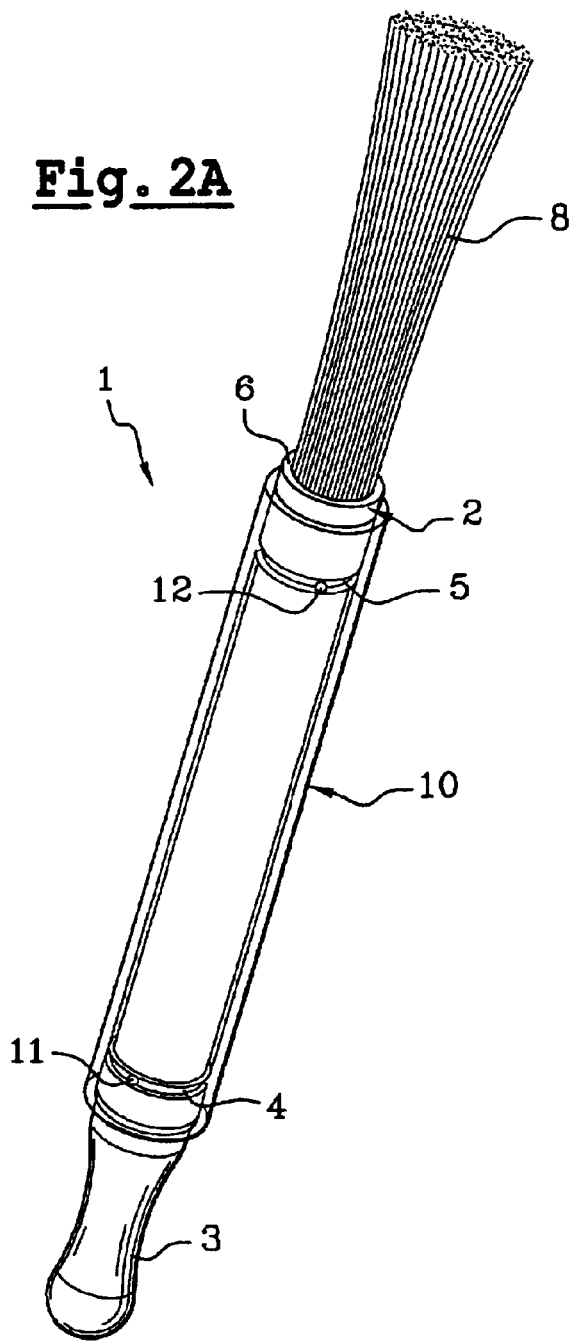
FIGS. 2A and 2B are perspective views of the device of FIG. 1 in assembled form, with the protective element in the second position and the first position, respectively; and, FIG. 3 is a perspective view of an exemplary embodiment of a display stand supporting a plurality of the devices shown in FIGS. 1, 2A, and 2B.
Figure 2B:
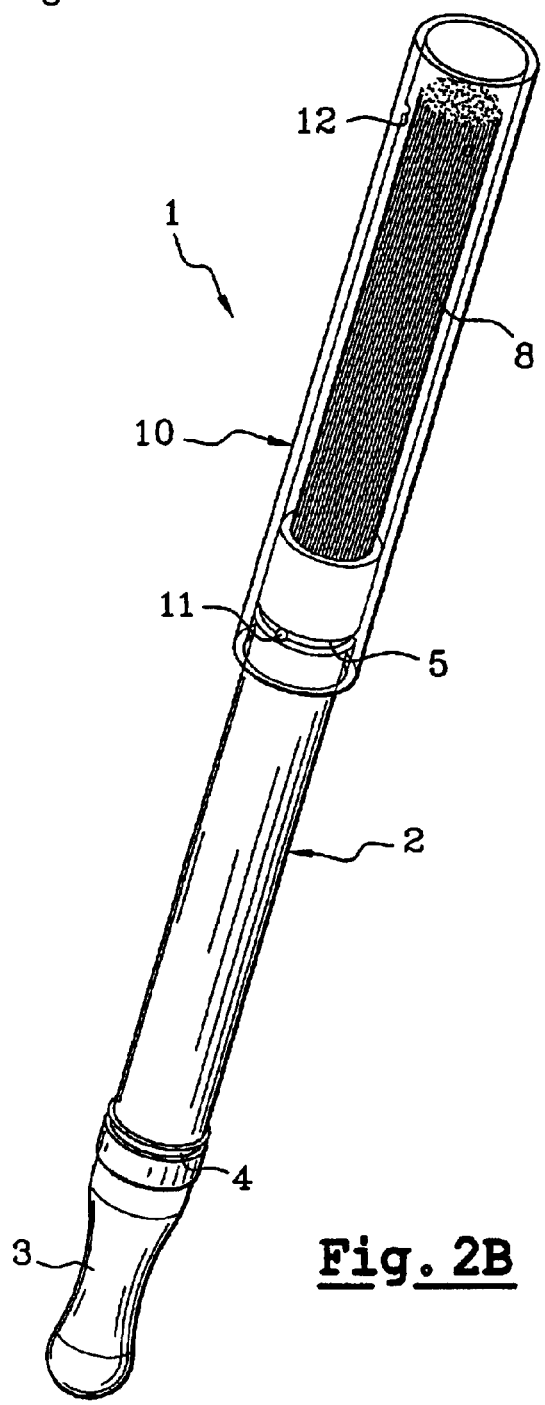

As shown in FIG. 1, an exemplary embodiment of the device 1 comprises an extended tubular support 2. A first end portion of the support 2 is closed and forms a narrowed region 3 of small cross section, as shown in FIGS. 1, 2A, and 2B. This region 3 of small cross section constitutes a grasping portion for the device 1. In one embodiment, the tubular support 2 may obtained by molding ABS. Other materials may also be used.

The support 2 has an annular groove 4, 5 on an outer surface near each of its ends.

A second end portion 6 of the support, opposite to the grasping portion, is open and is configured to receive an end portion 7 of a lock 8 in a gripping manner. The lock may be connected to the support with adhesive. Other connection means may also be used. In one embodiment, the length of the end portion 7 of the lock 8 is about 10 mm. End portions 7 having other lengths may also be used.

In another embodiment, the length of the strands of the lock 8 is about 80 mm. Locks 8 of strands having other lengths may also be used.

In a further embodiment, the number of strands in the lock 8 ranges from about 1,000 strands to 20,000 strands. In a still further embodiment, the number of strands in the lock 8 ranges from about 1,000 strands to 10,000 strands. In yet another embodiment, the number of strands in the lock 8 is about 3,000 strands. The strands may comprise strands of natural or synthetic hair. The synthetic hair may be made of nylon or other materials. The strands may have an appearance simulating that of strands of hair colored with hair dye.

The device 1 further comprises a protective element 10 having a tubular shape. In the embodiment shown in FIGS. 1, 2A, and 2B, the protective element 10 is open at both of its ends. Further, the protective element 10 is formed of a transparent material. In one embodiment, the transparent material is PLEXIGLAS.

The internal diameter of the protective element 10 is slightly greater than the external diameter of the support 2 so that the protective element 10 can slide over the support 2 between a first position, shown in FIG. 2B, and a second position, shown in FIG. 2A. In the first position, the lock 8 is at least substantially contained inside the protective element 10. In the second position, at least a portion of the lock 8 is at least partly accessible to touch. Thus, when the protective element 10 is in the second position, the lock 8 is released over the whole of its length located outside the support 2.

The sliding movement of the protective element 10 between the first and second positions is limited by the presence of lugs 11, 12 provided at each end of the protective element 10, on the internal surface of the tubular sleeve. The lugs 11, 12 are configured to engage the annular grooves 4, 5, provided on each of the ends of the support 2. In an alternative embodiment, the lugs 11, 12 may be provided on the support 2 and the grooves 4, 5 may be provided on the protective element 10.

In one embodiment, the engagement of the lugs 11, 12 in the grooves 4, 5 produces a sound, such as a clicking sound, to indicate that the lugs 11, 12 have properly engaged the respective grooves 4, 5.

When the protective element 10 is in the first position, as shown in FIG. 2B, the lock 8 is arranged inside the protective element 10 and is therefore protected from the external environment. In this arrangement, the color of the strands of the lock 8 is visible through the transparent sleeve 10.

To examine the lock 8 more closely, a user takes hold of the grasping portion proximate to the region 3 of the device 1 between, for example, the thumb and the index finger. The user then slides the protective element 10 over the support 2 so as to release the lock over its entire length until the lugs 11, 12 engage with the annular grooves 4, 5 of the support 2, as shown in FIG. 2A. With the protective element 10 in this position, the user may touch the lock and place it in contact with her hair so as to determine, in the presence of a mirror, the effect of the color of the lock in question on her own hair.

After examining the lock 8, the user returns the protective element 10 to the first position, shown in FIG. 2B, by sliding the protective element 10 over the support 2 in the reverse direction until the lugs 11 engage with the groove 5 of the support 2.

Figure 3:
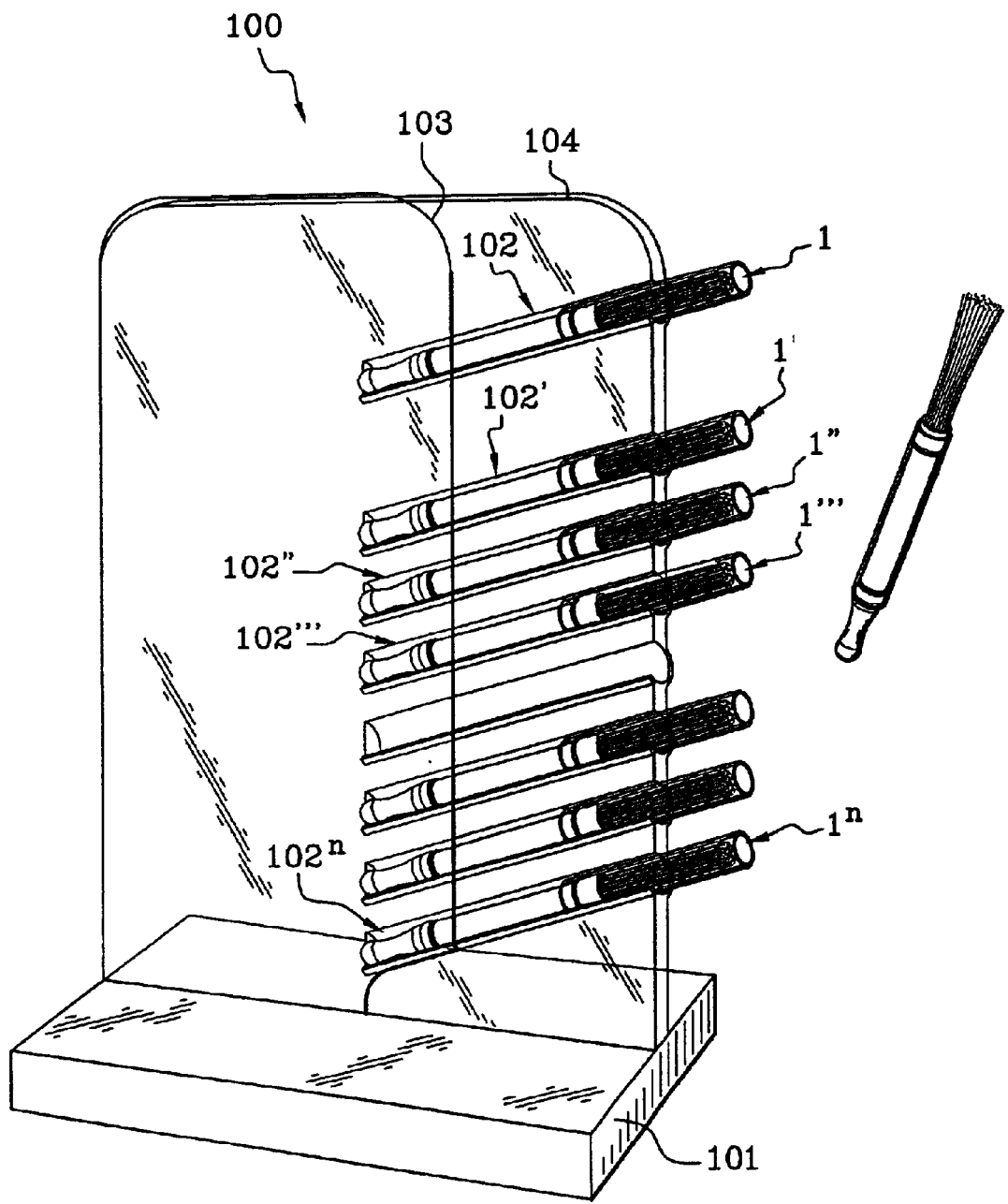

A plurality of devices 1, 1', 1", 1"', . . . , 1n according to the present invention may be arranged on a display stand 100, as shown in FIG. 3. The protective element 10 of the devices may be moved to the first position, as shown in FIG. 2B, before the devices are placed on the display stand.

The display stand 100 comprises a stand 101 on which two plates 103, 104 are mounted. The plates 103, 104 may be made from PLEXIGLAS or other materials. A plurality of inclined housings 102, 102', 102", 102"', . . . 102n are formed between the plates 103, 104. The housings are configured to receive the devices 1, 1', 1", 1"', . . . 1n. The width of the plate 103 is less than that of the plate 104 so as to facilitate access to the devices 1, 1', 1", 1"', . . . 1n. Further, the devices 1, 1', 1", 1"', . . . 1n have a length slightly greater than the depth of the housings 102, 102', 102", 102"', . . . 102n so that they can be grasped more easily for the purpose of being examined.

The portion of the display stand located opposite to the housings 102, 102', 102", 102"', . . . 102n may be used for affixing a design. The design may comprise commercial information relating to the product (e.g., trademark, slogan, logo, photograph) or other illustrations and/or information.

In the detailed description above, reference was made to several embodiments of the invention. It is noted that other embodiments may be made. For example, a single device may have two or more strands of different colors. Each strand may have a color which is uniform or variable, such as in gradation. Further, the strands may be arranged adjacent to each other and/or at opposite ends of the support. Still further, when the device has more than one lock, a protective element may be associated with each of the locks.

It will be apparent to those skilled in the art that various modifications and variations can be made to the structure of the present invention. Thus, it should be understood that the invention is not limited to the examples discussed in the specification. Rather, the present invention is intended to cover modifications and variations.

What is claimed is:

1. A device, comprising:

a support;

a lock connected to the support, the lock comprising a plurality of at least substantially rectilinear strands; and a protective element configured to protect the lock, at least a portion of the protective element being transparent, wherein the protective element is mounted to the support so as to permit movement of the support between a first position and a second position, wherein, when the protective element is in the first position, the lock is at least substantially contained inside the protective element, wherein when the protective element is in the second position, at least a portion of the lock is at least partly accessible to touch, wherein the support defines an axis, and wherein the plurality of strands of the lock extend from the support in a direction substantially parallel to the axis of the support.

2. The device of claim 1, wherein, when the protective element is in the first position, at least part of the lock is visible through said at least a portion of the protective element being transparent.

3. The device of claim 2, wherein only a portion of the protective element is transparent.

4. The device of claim 2, wherein the entire protective element is transparent.

5. The device of claim 1, wherein the protective element has an effective length at least as long as the length of the strands of the lock.

6. The device of claim 1, wherein the support comprises a grasping portion configured to permit a user to grasp the support with one hand while moving the protective element with another hand from one of the first and second positions to the other of the first and second positions.

7. A device, comprising:

a support;

a lock connected to the support, the lock comprising a plurality of at least substantially rectilinear strands; and a protective element configured to protect the lock, at least a portion of the protective element being transparent, wherein the protective element is mounted to the support so as to permit movement of the support between a first position and a second position, wherein, when the protective element is in the first position, the lock is at least substantially contained inside the protective element, wherein when the protective element is in the second position, at least a portion of the lock is at least partly accessible to touch, and wherein the support has an axial length greater than an axial length of the protective element.

8. The device of claim 1, wherein the protective element is irremovably mounted on the support.

9. A device, comprising:

a support;

a lock connected to the support, the lock comprising a plurality of at least substantially rectilinear strands; and a protective element configured to protect the lock, at least a portion of the protective element being transparent, wherein the protective element is mounted to the support so as to permit movement of the support between a first position and a second position, wherein, when the protective element is in the first position, the lock is at least substantially contained inside the protective element, wherein when the protective element is in the second position, at least a portion of the lock is at least partly accessible to touch, and wherein the device further comprises
a first locking member configured to lock the protective element in the first position; and
a second locking member configured to lock the protective element in the second position.

10. A device, comprising:
a support;
a lock connected to the support, the lock comprising a plurality of at least substantially rectilinear strands; and
a protective element configured to protect the lock, at least a portion of the protective element being transparent, wherein the protective element is mounted to the support so as to permit movement of the support between a first position and a second position,
wherein, when the protective element is in the first position, the lock is at least substantially contained inside the protective element,
wherein when the protective element is in the second position, at least a portion of the lock is at least partly accessible to touch, and
wherein the protective element has a tubular shape.

11. The device of claim 1, wherein the protective element is formed of a transparent material.

12. The device of claim 11, wherein the transparent material is PLEXIGLAS.

13. A device, comprising:
a support;
a lock connected to the support, the lock comprising a plurality of at least substantially rectilinear strands; and
a protective element configured to protect the lock, at least a portion of the protective element being transparent, wherein the protective element is mounted to the support so as to permit movement of the support between a first position and a second position,
wherein, when the protective element is in the first position, the lock is at least substantially contained inside the protective element,
wherein when the protective element is in the second position, at least a portion of the lock is at least partly accessible to touch,
wherein the support has a substantially cylindrical shape, and
wherein a first end portion of the support is configured to be grasped by a user and a second end portion of the support is connected to the lock.

14. The device of claim 13, wherein the second end portion of the support is hollow so as to receive an end portion of the lock in a gripping manner.

15. The device of claim 1, wherein the support and the protective element are formed of at least one thermoplastic material.

16. The device of claim 15, wherein the thermoplastic material is chosen from polystyrenes, polyethylene terephthalates, polyvinyl chlorides, styrene acrylonitriles, and acrylonitrile-butadiene-styrenes.

17. The device of claim 1, wherein the number of strands in the lock ranges from about 1,000 strands to about 20,000 strands.

18. The device of claim 17, wherein the number of strands in the lock ranges from about 1,000 strands to about 10,000 strands.

19. The device of claim 18, wherein the number of strands in the lock is about 3,000 strands.

20. The device of claim 1, wherein said at least a portion of the protective element being transparent is treated with at least one ultraviolet stabilizer.

21. The device of claim 1, wherein the strands comprise strands of natural hair.

22. The device of claim 1, wherein the strands comprise strands of synthetic hair.

23. A device, comprising:
a support;
a lock connected to the support, the lock comprising a plurality of at least substantially rectilinear strands; and
a protective element configured to protect the lock, at least a portion of the protective element being transparent, wherein the protective element is mounted to the support so as to permit movement of the support between a first position and a second position,
wherein, when the protective element is in the first position, the lock is at least substantially contained inside the protective element,
wherein when the protective element is in the second position, at least a portion of the lock is at least partly accessible to touch, and
wherein the protective element is slidable on an outside surface of the support during movement between the first and second positions.

24. The device of claim 1, wherein the strands have an appearance simulating that of strands of hair colored with hair dye.

25. A display comprising:
a display stand; and
at least one device of claim 1 associated with the display stand.

26. The display of claim 25, further comprising at least one additional device associated with the display stand.

27. The display of claim 26, wherein each of the devices comprises strands having an appearance different from that of the strands of the other devices.

28. The device of claim 25, wherein the device is removably attached to the display stand.

29. A system comprising a plurality of devices, wherein each of the devices is configured in the form of the device of claim 1, and wherein each of the devices comprises strands having an appearance different from that of the strands of the other devices.

30. The device of claim 1, wherein the protective element contacts the support in the second position.

31. A device, comprising:
a support;
a lock connected to the support, the lock comprising a plurality of at least substantially rectilinear strands; and
a protective element configured to protect the lock, at least a portion of the protective element being transparent, wherein the protective element is mounted to the support so as to permit movement of the support between a first position and a second position,
wherein, when the protective element is in the first position, the lock is at least substantially contained inside the protective element,
wherein when the protective element is in the second position, at least a portion of the lock is at least partly accessible to touch,
wherein the support defines an axis, and
wherein the plurality of strands of the lock extend from the support in a direction substantially parallel to the axis of the support.

* * * * *